United States Patent [19]

Chevillat et al.

[11] 4,447,908
[45] May 8, 1984

[54] METHOD OF TRANSMITTING BINARY DATA SEQUENCES AND ARRANGEMENT FOR ENABLING THE RAPID DETERMINATION OF THE END OF A TRANSMITTED BINARY DATA SEQUENCE

[75] Inventors: Pierre R. Chevillat, Adliswil; Gottfried Ungerboeck, Langnau, both of Switzerland

[73] Assignee: International Business Machines Corp., Armonk, N.Y.

[21] Appl. No.: 327,006

[22] Filed: Dec. 3, 1981

[30] Foreign Application Priority Data

Dec. 23, 1980 [EP] European Pat. Off. ...... 80 108 156.3

[51] Int. Cl.³ ............................................. H04L 27/18
[52] U.S. Cl. ......................................... 375/42; 375/67; 332/16 R
[58] Field of Search ................. 375/42, 67, 114, 116, 375/37, 39; 332/9 R, 16 R; 340/347 DD; 370/100

[56] References Cited

U.S. PATENT DOCUMENTS

| | | | |
|---|---|---|---|
| 3,955,141 | 5/1976 | Lyon et al. | 375/42 |
| 4,077,021 | 2/1978 | Csajka et al. | 375/67 |
| 4,334,312 | 6/1982 | Yoshida | 375/42 |
| 4,347,616 | 8/1982 | Murakami | 375/42 |

*Primary Examiner*—Robert L. Griffin
*Assistant Examiner*—Stephen Chin
*Attorney, Agent, or Firm*—Edward H. Duffield

[57] ABSTRACT

A communication method and arrangement are disclosed which provide, for a trellis encoding process in the transmitter and a maximum-likelihood decoding process in the receiver, an additional fifth state (ZS) in addition to the usual four coding states (S0 ... S3). The fifth state is entered in the transmitter at the end of transmission when a particularly selected escape symbol from a set of four escape symbols (E0 ... E3) each associated to one of the four normal coding states is sent by an encoder supplement (15). In the receiver, a stop signal indicating end of transmission is only generated when, after the usual decoder delay, a path decoder (63) determines that an escape symbol was received, and a trellis decoder (61) indicates the fifth state (ZS) to be the most probable one. This enables rapid and secure determination of the end of a transmitted sequence without the need for additional transmission symbols or decoder cycles.

4 Claims, 8 Drawing Figures

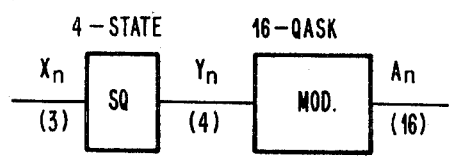
FIG. 1
PRIOR ART
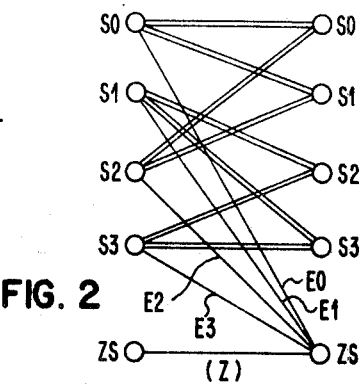
FIG. 2
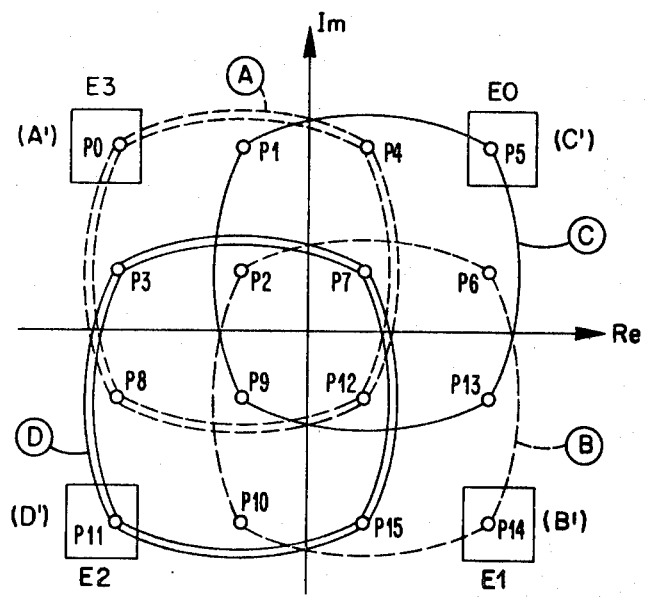
FIG. 3
| TRANSITION | SUBSET | SYMBOLS |
|---|---|---|
| S0 → S0 | A | P0 / P4 / P8 / P12 |
| S0 → S1 | B | P2 / P6 / P10 / P14 |
| S1 → S2 | C | P1 / P5 / P9 / P13 |
| S1 → S3 | D | P3 / P7 / P11 / P15 |
| S2 → S0 | B | P2 / P6 / P10 / P14 |
| S2 → S1 | A | P0 / P4 / P8 / P12 |
| S3 → S2 | D | P3 / P7 / P11 / P15 |
| S3 → S3 | C | P1 / P5 / P9 / P13 |
| S0 → ZS | C' | E0 (= P5) |
| S1 → ZS | B' | E1 (= P14) |
| S2 → ZS | D' | E2 (= P11) |
| S3 → ZS | A' | E3 (= P0) |
FIG. 4

METHOD OF TRANSMITTING BINARY DATA SEQUENCES AND ARRANGEMENT FOR ENABLING THE RAPID DETERMINATION OF THE END OF A TRANSMITTED BINARY DATA SEQUENCE

FIELD OF THE INVENTION

The present invention is concerned with a method of transmitting binary data sequences in the form of transmission symbols represented by modulation states of a carrier signal. In particular, it is concerned with such a method in which an end of transmission is characterized in such a way that it can be recognized fast and reliably. The invention is further concerned with an arrangement enabling the rapid determination of the end of a binary data sequence transmitted in the form of transmission symbols represented by modulation states of a carrier signal.

BACKGROUND

In synchronous data communication systems, which use telephone lines as the transmission medium, the data are represented as a sequence of modulation states of a carrier signal. The modulation states are taken from a finite set of discrete amplitude and/or phase values which are called the transmission symbols. In the transmitters and receivers, the carrier is modulated and demodulated in modems according to given rules.

In a simple method, the sequence of binary data is separated into data words (e.g., 3-bit words) and each data word is directly represented by a corresponding transmission symbol (e.g. one of eight discrete phase values). More elaborate methods provide some redundancy to enable error detection and possibly correction. Even more sophisticated methods are known which employ a combined sequential encoding and modulation procedure in the transmitter and a particular sequential decoding process in the receiver so that, in the presence of signal distortion and noise, the original data sequence can be detected by the receiver with a larger margin for disturbances than if each data word were separately represented as a transmission symbol and separately detected.

In most transmission systems it is necessary to detect the end of a transmitted data sequence in order of the transmitted data. The exact moment when physical transmission ceases is difficult to detect for a modem receiver. Assume that the transmitter sends a sequence of transmission symbols from a given set (e.g. a set of 16 QASK symbols as shown in FIG. 3 of this specification), and an unmodulated carrier or zero energy after the end of transmission. Without a special end-of-transmission mechanism in the receiver it will be difficult to distinguish the "zero-symbol" from the symbols of the normal set (e.g. particularly from the innermost four symbols of the 16 QASK symbols of FIG. 3).

Turning the receiver off after detecting a single "zero-symbol" results in occasional erroneous receiver stops when the channel is noisy, or causes the modem to miss the end of transmission. Waiting for many "zero symbols" reduces the false-stop probability but does not lower the probability of missing the exact end of transmission. As a consequence, end-of-transmission control is usually left to a data link protocol which indicates end of transmission by a certain sequence of data bits transmitted. This solution has the disadvantage that end of transmission is protocol dependent and must be decided by the data terminal equipment that receives the data from the modem. The modem does not immediately detect the physical end of transmission and hence, e.g. in a half-duplex situation, it cannot immediately effect a line turn-around.

PRIOR ART

It is therefore desirable to provide a mechanism for fast and reliable detection of the physical end of transmission. System using the above mentioned combined sequential encoding and modulation process and specific sequential decoding process offer possibilities that are utilized by the present invention for an improved solution.

In general, such systems, and the basic principles of sequential encoding and decoding utilized therein, are known from the following patent and publications:

U.S. Pat. No. 4,077,021 "Method and Arrangement for Coding Binary Signals and Modulating a Carrier Signal" inventors I. P. Csajka and G. Ungerboeck, assignee International Business Machines Corporation, granted Feb. 28, 1978.

I. A. Heller and I. M. Jacobs: "Viterbi Decoding for Satellite and Space Communication", IEEE Trans. on Communication Technology, Vol. COM-19, No. 5, Oct. 1971, pp. 835-848.

G. D. Forney: "The Viterbi Algorithm", Proceedings of the IEEE, Vol. 61, No. 3, March 1973, pp. 263-278.

P. M. Schalkwijk and A. J. Vinck: "Syndrome Decoding of Binary Rate—½ Convolutional Codes", IEEE Trans. on Communications, Vol. COM-24, No. 9, Sept. 1976, pp. 977-895.

A. S. Acampora and R. P. Gilmore: "Analog Viterbi Decoding for High-Speed Digital Satellite Channels", IEEE Trans. on Communications, Vol. COM-26, No. 10, Oct. 1978, pp. 1463-1470.

P. R. Chevillat: "Hardware Viterbi Decoder with a ROS-Trellis Structure", IBM Technical Disclosure Bulletin, Vol. 22, No. 3, Aug. 1979, pp. 1195-1196.

The U.S. Pat. and the other publications are all concerned with systems and methods for transmitting data by sequential coding and modulation, and employing Viterbi decoding, using a trellis structure for the coding and decoding process. None of them specifically discloses how an end-of-transmission situation can be efficiently handled.

OBJECTS OF THE INVENTION

It is an object of the present invention to provide an improved method by which the end of a transmission sequence can be securely and rapidly detected in a system using discrete carrier modulation states as transmission symbols.

It is a further object to devise such an improved method which optimally utilizes the inherent capabilities of a system utilizing sequential encoding and trellis decoding in the transmission process.

A further object of the invention is to provide an improved method of transmitting binary data sequences which allows fast recognition of each end of a transmission sequence with a minimum in additional complexity for the mechanism in sender and receiver.

SUMMARY OF THE INVENTION

The method by which these objects are achieved and which solves the stated problem is defined in the claims, but may be summarized as follows.

To allow in a telephone line modem receiver fast determination of the moment when transmission ends, the encoder in the transmitter and the decoder in the receiver are provided with a fifth internal state in addition to the usual four internal states. In the encoder, the fifth state is entered when a transmission end control signal is received, causing the transmission of a single escape symbol, followed by zero energy (no symbol at sample times). In the receiver, the fifth state is entered when an escape symbol is received, and this state is maintained when no symbols (zero energy) are received thereafter.

BRIEF DESCRIPTION OF DRAWINGS

A preferred embodiment of the invention will be described in connection with drawings which show the following:

FIG. 1 is a schematic block diagram representation of the prior art coding and modulation process;

FIG. 2 is a trellis for a four-state sequential coding and decoding process with an additional fifth state plus corresponding state transitions according to the invention;

FIG. 3 a diagram of a 16-QASK set of transmission symbols subdivided in subsets for use with a trellis of FIG. 2, plus indication of escape symbols according to the invention;

FIG. 4 a table showing the possible transitions between coder/decoder states, and associated symbols, plus additional state transitions and escape symbols according to the invention, based on the trellis and symbol set of FIGS. 2 and 3;

DETAILED DESCRIPTION

Figure 5:
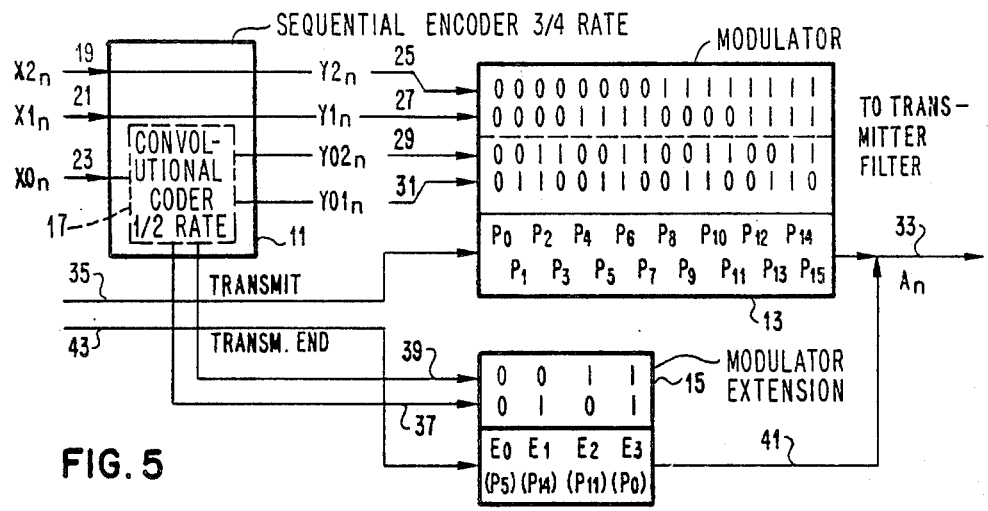
FIG. 5 a block diagram of transmitter circuitry for a system utilizing the invention.

The principles of the invention as well as a particular implementation and its relation to the prior art will be explained in connection with FIGS. 1 through 4. Transmitting and receiving circuitry for the chosen embodiment and their operation will be described in connection with FIGS. 5 through 8.

KNOWN PRINCIPLES OF CODER AND TRANSMITTER

A basic block diagram of a transmitter in which the invention will be utilized is shown in FIG. 1. Data samples $X_n$ which are to be transmitted are expanded in a sequential encoder SQ to coded bit groups $Y_n$. Each bit group $Y_n$ will then control a modulator MOD to modulate a carrier to represent a transmission symbol $A_n$ which is one of several possible modulation states.

In the present example, input samples $X_n$ are 3-bit groups which are expanded to 4-bit groups $Y_n$ by SQ. Coder SQ has four internal states S0...S3, and its current status depends on a sequence of previously entered samples $X_{n-1}$, $X_{n-2}$, etc. Modulator MOD, in this example, controls the carrier to assume 16 different states representing 16 symbols P0...P15 as shown in FIG. 3. Each symbol is represented by a real and an imaginary value (complex-valued symbols).

Thus, in response to each 3-bit input sample $X_n$, there will appear one of 16 possible transmission symbols $A_n$ at the output, but the output symbol depends on both the present input sample and the internal state of SQ. This dependence on the sequence of input samples, and the redundancy provided (16 different symbols instead of only 8, for representing 3-bit input samples), plus a specific assignment between expanded bit groups $Y_n$ and the 16 available symbols for $A_n$, allows an efficient recovery of the transmitted data in the receiver despite transmission errors, if the so-called Viterbi decoding process is used.

More details of this process can be found in U.S. Pat. No. 4,077,021 (already mentioned) and in the publications cited in the introduction.

As shown in FIGS. 2, 3 and 4, only selected transitions are allowed between the four states of the coder in the present example. Thus, from state S0 there are four possible transitions within the same state S0 (subset A) each represented by a different symbol. There are four further possible transitions which lead from state S0 to state S1 (subset B) and these four are also each represented by different symbols. Similar conditions are valid for transitions from the three other states (subsets C, D).

As can be seen from FIGS. 3 and 4, association between transitions and symbols are so chosen that overall, the symbols of each symbol subset used for a subset of transitions (e.g. S0 to S1) have as large a distance from each other as possible, to enhance the ability to recover from errors.

INVENTION PRINCIPLES

It is now suggested by the invention, as a means for enabling a rapid detection of the end of a transmission sequence, not to send a specific terminating sequence of symbols, nor to fall directly into zero energy state (or to a unmodulated carrier) after the last transmitted data symbol. The method is rather to send a single specifically selected control symbol and thereafter to enter the zero energy state.

This new method eliminates the need for the receiver waiting for a prolonged time to ensure that the absence of transmission symbols is not a transient error but is really due to the end of a transmitted data sequence. The proposed method does not need additional transmission symbols.

The new method is particularly useful for half-duplex communication arrangements or for situations where a switch-over from full-duplex to half-duplex operation is provided in case of partial failure of a system. It allows switching from one direction of transmission to the other in the shortest possible time, i.e., no more time is needed than the inherent delay of the sequential decoding process, because each modem can directly generate the switching signal, and no waiting for a recognition procedure in an attached device or terminal is necessary.

FIGS. 2 & 4 show the principle: Instead of allowing only the defined transitions between four states S0...S3, a transition from each of these states into the zero energy state ZS as a fifth state is allowed. One specific symbol, called an "escape symbol", is associated with each of the four possible transitions.

The four escape symbols E0...E3 have to be selected, of course, from the available set of 16 transmission symbols shown in FIG. 3. The association, however, between transitions and escape symbols is so chosen that each escape symbol is not a member of the symbol subset usually associated with the respective state from which the escape transition occurs.

Thus, e.g., the symbols usually used for transitions from S0, i.e. P0/P4/P8/P12 and P2/P6/P10/P14 are members of subsets A and B. The escape symbol chosen for S0, i.e. E0, is taken from subset C. It is equal to the symbol P5, and could itself be considered a single symbol subset, C'. Similar relations exist for the three other escape symbols E1, E2, and E3 which are equal to normal symbols P14, P11, and P0 respectively, and which could each be considered a particular single-symbol subset B', D', and A' respectively.

In the table of FIG. 4, the bottom section shows these additional four transitions to the fifth or "zero energy" state ZS, as well as the associated escape symbols E0...E3, while the upper two sections show the trellis transitions between four states S0...S4 which are known from the prior art.

This specific selection and assignment of escape symbols will enable a reliable and fast detection of a transmission end situation without requiring additional transmission symbols (i.e. the available set of 16 transition symbols need not be expanded). The events for entering the fifth or zero energy state in connection with transmitting an escape symbol, and for detecting reception of the escape symbol, will now be explained in connection with exemplary preferred embodiments of transmitter and receiver circuitry.

Instead of the shown implementation based on the four-state trellis of FIG. 2 (upper part) and using a set of 16 QASK symbols, as shown in FIG. 3, the invention is of course applicable as well to other systems using any set of transmission symbols and based on any other trellis configuration, provided, however, that the transmission symbol set is redundant with respect to the set of input data samples $X_n$ (i.e., $2^{n+k}$ different symbols must be available for representing $2^n$ different possible input values $X_n$).

EMBODIMENTS OF TRANSMITTING AND RECEIVING CIRCUITRY

Transmitting and receiving circuitry embodying the invention are shown in block form in FIGS. 5 through 8. They are based on the trellis of FIG. 2, the transmission symbol set of FIG. 3, and the association table shown in FIG. 4.

Figure 6:
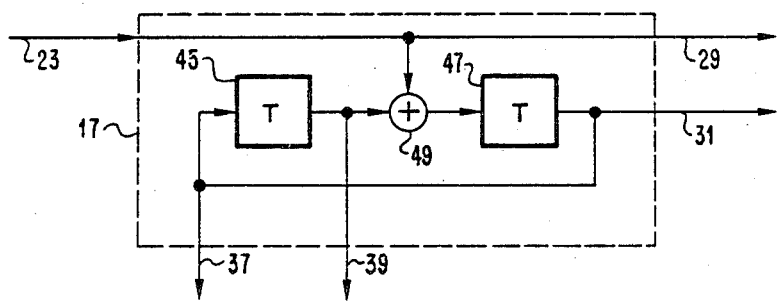
FIG. 6 a convolutional encoder for the transmitter circuitry of FIG. 5.
Figure 7:
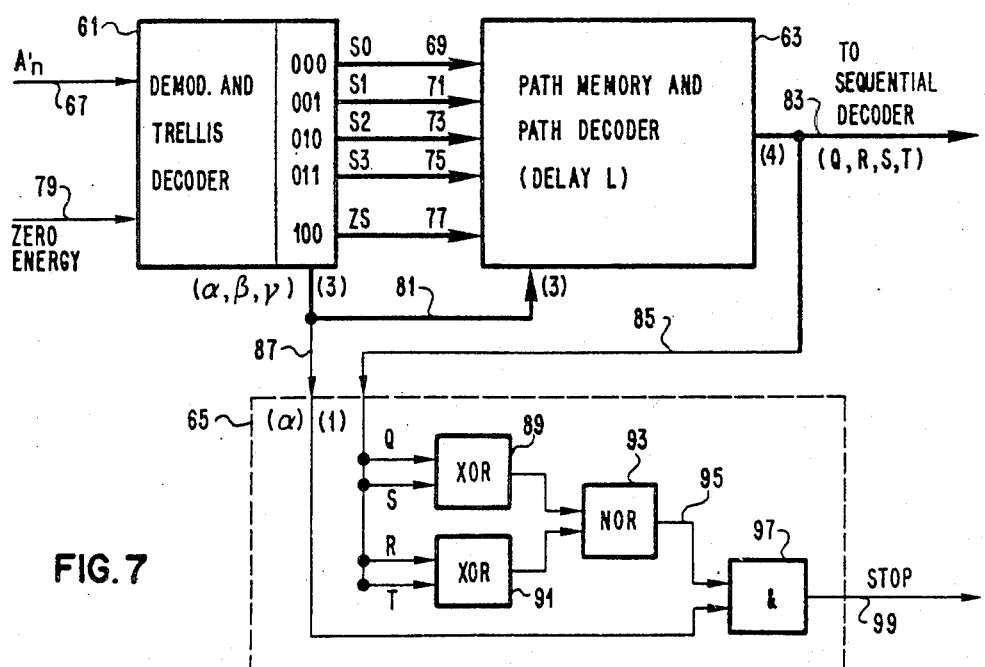
FIG. 7 a block diagram of receiver circuitry for a system utilizing the invention.

The transmitter circuitry of FIG. 5 is basically the same as that shown in FIG. 7 of the above-mentioned U.S. Pat. No. 4,077,021. It comprises a sequential encoder 11 and a modulator 13. An escape symbol modulator extension 15 is provided for embodying the present invention. Sequential encoder 11 which is a rate $\frac{3}{4}$ convolutional coder (i.e., this produces 4 output bits for 3 input bits) comprises two unchanged input bits and a rate $\frac{1}{2}$ convolutional coder 17 operating on one input bit. It has the same function as, and is similar to the rate $\frac{1}{2}$ coder disclosed in above mentioned U.S. Pat. Details of this very simple convolutional coder will be briefly described in connection with FIG. 6.

Three-bit words ($X0_n$, $X1_n$, $X2_n$) supplied on input lines 19, 21, 23 are expanded to four-bit samples ($Y01n$, $Y02n$, $Y1n$, $Y2n$) by encoder 11 which has four internal states. $X0_n$ is expanded to $Y01_n$ and $Y02_n$ by the $\frac{1}{2}$ convolutional coder 17; the other two input bits are unchanged. The expanded four-bit groups are provided on lines 25, 27, 29, 31. Modulator 13, in response to each four-bit group, modulates a carrier signal to assume one of sixteen possible states, which is then furnished as transmission symbol $A_n$ on output line 33. Signals on line 33 are forwarded to a transmission filter and any further necessary transmission circuitry. Modulator 13 is active, however, only as long as a "transmit" control signal on line 35 is active. If this control signal is inactive, no energy or an unmodulated carrier will be transmitted (except for a period when the "transmit end" signal is active, cf. next paragraph).

Escape symbol modulator extension 15 has two inputs connected to two separate encoder output lines 37 and 39. Bit signals on these two lines represent the internal state of encoder 11, i.e. of convolutional rate $\frac{1}{2}$ coder 17. In response to any one of the four possible 2-bit combinations representing the current internal encoder state, it modulates the carrier signal to assume one of four possible states, which is then furnished as escape symbol (E0, E1, E2, E3) on output 41 to modulator output line 33. This modulator extension 15 is, however, only enabled for one sampling period when a "transmission end" control signal is active on line 43. This signal and also the "transmit" control signal on line 35 are generated by the sending device which furnishes the three-bit input samples.

FIG. 6 shows details of the rate $\frac{1}{2}$ convolutional coder 17 of FIG. 5. It comprises two delay elements (or one-bit storage elements) 45 and 47 and one modulo-2 adder 49 which are interconnected as shown in the figure. The outputs on lines 29 and 31 depend on the present and the previous input bits that were sequentially applied to input line 23. The outputs on lines 37 and 39 representing the internal coder state depend on the previous input bits that were sequentially applied to input line 23.

Receiving circuitry shown in FIG. 7 basically comprises a demodulator/trellis decoder 61, and a path memory/path decoder 63. Decoder supplement 65 is additionally provided for recognizing the presence of an escape symbol.

Demodulator/trellis decoder 61 determines, with reference to the trellis of FIG. 2, for each transmission symbol $A'_n$, received on input 67, which would be the best, i.e. the most probable of the possible paths leading to each of the states S0...S3, and of the possible paths leading to the fifth state ZS. On each of five line groups 69, 71, 73, 75, 77 this best choice will be represented in coded 3-bit form for the respective state. A "zero energy" input line 79 to the demodulator/trellis decoder 61 will be activated when no transmission symbol $A'_n$ (an unmodulated carrier or no signal energy) was received on the transmission channel.

Three extra output lines 81 of demodulator/trellis decoder 61 are provided for indicating, in coded 3-bit form $\alpha$, $\beta$, $\gamma$, which of the five states would be the current best choice, i.e. the most probable state on the basis of the previous optimum choices and the last-received transmission symbol $A'_n$ and the zero-energy signal on line 79. That is, knowing the optimum phase amplitude shifts from a given state necessary to transmit a given code group, one may predict the most probable received phase/amplitude levels that will be detected at the receiver. However, due to phase/amplitude shift and distortion, those received phase/amplitude levels will not correspond exactly to the ideal values but will be approximate or close to one of these ideal values which may then be decoded as the intended or most probable value as described in the aforementioned U.S. patent and related articles.

In a Viterbi decoder, not all possible paths are remembered. Rather, at each sampling time, one selects for each of the four possible states only one "survivor", i.e., the one path having the best metric, and discards the other possible paths. This greatly reduces computing effort and storage requirement, and has no impact on decoder performance.

Thus, a normal Viterbi decoder must always store the latest four survivor paths, (actually, a coded description of these paths), and the metric L, i.e., the likelihood value for each of these four paths. At the next sampling time, it uses these values, plus the symbol which was received in the last sampling period, plus the knowledge about the code structure, i.e., the "allowed" transitions, to compute a new metric for all sixteen possibilities (i.e., four inputs to each of the four states), and then again selects four survivors (one for each state), and stores the respective paths (coded) and corresponding metric values.

The decoder section described above only computes metric values and selects survivor paths. In another section, final selection of one path, and its decoding into an output symbol sequence is made. The decision made has a delay of several sampling periods because the four present survivor paths have most probably a "common root", i.e., only for the last m (say 8) sampling periods, the survivor paths may differ, but further back they coincide, i.e., they are the same. It should be noted that these final decisions are also made step by step, i.e., at each sampling time, the final decision and decoding is made only for one sampling period (with a delay of m sampling intervals).

All output signals of demodulator/trellis decoder 61 are furnished to path memory/path decoder 63. The latter, after a delay of L sampling periods, determines which was most likely the transmitted symbol $A_n$ that resulted in the received symbol $A'_n$ on line 67. Path memory/path decoder 63 furnishes on its output 83 a four-bit group Q, R, S, T which represents the most likely transmitted symbol. This four-bit group is equivalent to the expanded four-bit group $YO1_n$, $YO2_n$, $Y1_n$ and $Y2_n$ in the transmitter. Thus, Q, R, S, T must be furnished to a sequential decoder for reduction to a three-bit group $XO_n$, $X1_n$ and $X2_n$. This sequential decoder is the straight-forward analog to the sequential encoder used in the transmitter, and therefore need not be shown here in detail. In the present embodiment, it would be sufficient to eliminate the fourth bit T, and to forward only the first three bits Q, R, S (i.e. no particular additional sequential decoder is required here).

Figure 8:
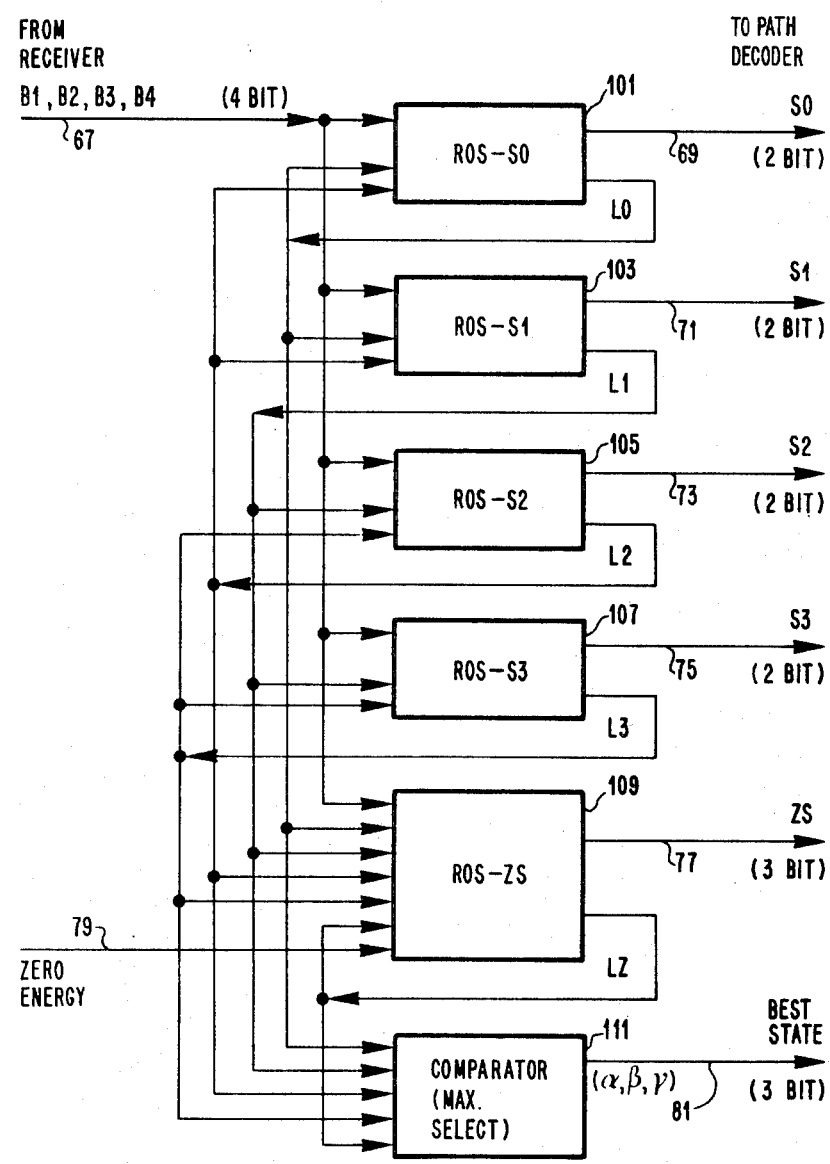
FIG. 8 a trellis decoder for the receiver circuitry of FIG. 7.

Details of an embodiment for demodulator/trellis decoder 61 are shown in FIG. 8 which will be described separately. Path memory/path decoder 63 need not be described here in detail because its functions and elements will be evident to anybody skilled in the art from the many prior art descriptions of Viterbi decoders, e.g. those mentioned in the introduction to this specification.

As was mentioned above already, decoder supplement 65 is provided for recognizing the presence of an escape symbol that indicates end of transmission. It has a four-bit input 85 that is connected to the path memory/path decoder output 83 for receiving each of the four-bit groups Q, R, S, T. A further single-bit input 87 is connected to that one of best-state indicator lines 81 which represents the zero energy state ZS, i.e. the first bit or α-bit of the three bits representing the best state.

Two X-OR gates 89 and 91 and one NOR gate 93 together decode the four output bits Q, R, S, T. The signal on line 95 is only activated when one of the four escape symbols is present (E0=P5=0101; E1=P14=1111; E2=P11=1010; E3=P0=0000). This signal on line 95 is combined with the signal on line 87 in AND gate 97 so that a STOP signal (end of transmission indication) is activated on line 99 only when two conditions are simultaneously met: determination that an escape symbol or zero-energy signal was present in the path memory was, and determination that the zero energy state ZS was the best (most probable) state.

From above description of the receiver circuitry shown in FIG. 7 it is evident that neither a short energy outage (indicated on input line 79) nor the erroneous reception of an escape symbol (indicated on line 67) will lead to a stop signal on line 99. Only if the path decoder determines from the inputs it received during the last L intervals, that the symbol received L sampling periods ago should most probably have been an escape symbol and only if the trellis decoder determines that the zero-energy decoder state ZS is the most probable state, will a stop pulse be furnished on output line 99. This is the fastest possible way to achieve secure detection of an end of transmission (in a decoder with an inherent delay of L sampling intervals).

FIG. 8 shows details of the trellis decoder part of demodulator/trellis decoder 61. This trellis decoder is similar to the one disclosed in above-mentioned article by P. Chevillat "Hardware Viterbi Decoder with a ROS-Trellis Structure". Received symbols $A'_n$ (i.e. received modulation states of the carrier) are converted by a hard decision to four-bit groups B1, B2, B3, B4. Thus, the demodulator (which is of well-known design and therefore need not be described in detail) furnishes at each sampling instant one discrete four-bit value out of sixteen possible values. (Some form of soft demodulation by which more than sixteen discrete values would be obtained and which would require further processing steps in the decoding procedure is of course possible but will not be considered in the present embodiment).

The trellis decoder of FIG. 8 comprises six decoder modules 101, 103, 105, 107, 109 and 111. These decoder modules may be implemented as read-only storage modules (ROS), each of which furnishes for a set of input data a corresponding set of output data. Five of the modules are associated to the five trellis states S0, S1, S2, S3 and ZS that are shown in FIG. 2. Each of these five modules determines from previous metric values (L0...LZ) and from the last received symbol (B1...B4) which one of the four (resp. five) transition paths leading to it in the trellis has the best metric, and furnishes this metric value (normalized to a given range if necessary) and a coded representation of the best path at its two outputs. The five state modules 101...109 are interconnected in a way that represents the trellis of FIG. 2.

S0 module 101 furnishes metric L0 at its output which is connected to one of its own inputs and to an input of the S1 module 103. It receives on its inputs its own (previous) metric L0, the (previous) metric L2 from S2 module 105, the four bits B1...B4 representing the last-received symbol (lines 67). It provides on its output lines 69 a 2-bit coded indication of the presently most probable of the four transition paths leading to this state. This path indication is furnished to path memory/path decoder 63 as was described above already.

Similar connections and signal associations are given for modules 103, 105, and 107 representing states S1, S2, and S3. Module 109 for the fifth or zero energy state ZS is furnished at its inputs with the received symbol bits B1...B4 (lines 67), the zero energy indication (line 79), and the (previous) metric values L0...L4 from all four other state modules, plus its own (previous) metric value LZ. It provides on its output lines 77 a 3-bit coded indication of the presently most probable of the five transition paths leading to it. Four of these transitions are associated each to one escape symbol, and the fifth transition corresponds to a continuing zero energy state (i.e. transition from ZS to ZS.)

The sixth module 111 of the trellis decoder is a comparator that determines which of the five transition paths represented on the five module output line groups 69, 71, 73, 75, and 77 has the optimum metric and thus is the most probable path. Therefore, the comparator module receives at its inputs the five metric values L0, L1, L2, L3, and LZ. It compares them and provides on its output lines 81 a 3-bit coded representation ($\alpha, \beta, \gamma$) of the state which has the best metric value. The five states are coded as shown in FIG. 7: S0=000, S1=001, S2=010, S3=011, ZS=100.

It is to be understood that appropriate timing signals or clocked logic circuits must be provided in the trellis decoder of FIG. 8 so that metric values L0...LZ furnished at the module outputs are applied to the module inputs only for the next operation cycle, i.e. they must be combined with receiver input bits B1...B4 (and the zero energy state indication) of the next sampling period.

Having thus described our invention with regard to a preferred embodiment thereof, it will be readily apparent to those of skill in the art to make departures on specific implementation which do not violate the basic teaching or method herein.

Therefor, what is described and intended to be pretected by Letters Patent is set forth in the following claims by way of general representation rather than limitation, wherefor what is claimed is:

1. A method of transmitting input binary data sequences in the form of transmission symbols represented by modulation states of a carrier signal at discrete sampling times, said method comprising the steps of encoding said input binary data sequence in a sequential encoder (11) having n integral number internal states and furnishing an encoded bit group at each sampling time, reflecting the input data and the internal state at said sampling time, transmitting in response to each encoded bit group one associated transmission symbol from a given set of transmission symbol (P0...P15) which is subdivided into disjoint subsets, the subset of which the transmitted symbol is a member being associated to said internal encoder state and ending said transmission by, transmitting one escape symbol from a set of escape symbols (E0...E3) which is a further subset of the set of transmission symbols, comprising selected transmission symbols of said disjoint subsets, the transmitted escape symbol being dependent on the internal encoder state but being not a member of any of the transmission symbol subsets usually associated with said internal encoder state, and transmitting an unmodulated carrier or no carrier signal at all after said escape symbol is transmitted.

2. Method in accordance with claim 1, further comprising maximum-likelihood decoding in a receiver including a trellis decoder (61) and a path decoder (63), characterized in that said decoder includes a step for each of n+1 different states corresponding to said n internal transmitter encoder states (S0...S3), an additional zero-energy state (ZS), and a step of determining a most probable transition path from a predecessor state and a step of transferring indications for these n+1 most probable transition paths to said path decoder, and representing the most probable of said n+1 different states at an output of trellis decoder. and a further step of furnishing said path decoder, after a given delay of L sampling intervals and in response to the received transition path indications, a bit group representing the decision for a received symbol; and furnishing an end-of-transmission indication by a logic unit (65) in response to simultaneous occurence of the indication by said trellis decoder that the zero-energy state is the most probable state, and the furnishing of a bit group representing an escape symbol by said path decoder.

3. Apparatus for enabling rapid determination of the end of a binary data sequence transmitted in the form of transmission symbols represented by modulation states of a carrier signal at discrete sampling times, said apparatus comprising., a transmitter which includes an encoder (11) having n integral number internal states, which furnishes in response to its internal state and an input bit group an expanded bit group (25, 27, 29, 31) and an internal state indication (37, 39), and means (13) furnishing in response to each expanded bit group from said encoder, a transmission symbol representation (P0...P15) from a given set which is divided into subsets which are associated to said internal encoder states, and further including means (15) furnishing in response to a transmission end signal (43) and an internal state indication (37, 39) from said encoder, an escape symbol representation (E0...E3) from a set of n integral number representations, which corresponds to a transmission symbol representation from a subset of said subsets not associated with the present internal encoder state.

4. Apparatus as described in claim 3, comprising:

a receiver having a maximum-likelihood decoder which includes a trellis decoder (61) and a path decoder (63) connected to receive the output of said trellis decoder for providing the output symbol Q, R, S or T in response thereto, and said trellis decoder having outputs (69, 71, 73, 75, 77, 81) for furnishing to said path decoder best path indications for n+1 states (S0, S1, S2, S3, ZS) and an indication ($\alpha, \beta, \gamma$) which of said n+1 states has the best path metric, one of said n+1 states being a zero-energy state normally not entered during transmission of a binary sequence; and having a coincidence logic unit (65) connected to receive data from said trellis decoder and said path decoder, for generating a stop signal on its output (99) in response to input data representing, respectively, the zero-energy state (zS) as best metric state, and the output symbol (Q, R, S, T) as escape symbols.

* * * * *